(12) United States Patent
Wagner

(10) Patent No.: US 12,553,153 B2
(45) Date of Patent: Feb. 17, 2026

(54) SPINNING BEAM

(71) Applicant: GAMBRO LUNDIA AB, Lund (SE)

(72) Inventor: Steffen Wagner, Meßstetten (DE)

(73) Assignee: GAMBRO LUNDIA AB, Lund (SE)

( * ) Notice: Subject to any disclaimer, the term of this patent is extended or adjusted under 35 U.S.C. 154(b) by 218 days.

(21) Appl. No.: 18/006,403

(22) PCT Filed: Jul. 21, 2021

(86) PCT No.: PCT/EP2021/070330
§ 371 (c)(1),
(2) Date: Jan. 23, 2023

(87) PCT Pub. No.: WO2022/018116
PCT Pub. Date: Jan. 27, 2022

(65) Prior Publication Data
US 2024/0011194 A1    Jan. 11, 2024

(30) Foreign Application Priority Data

Jul. 22, 2020   (EP) ..................................... 20187259

(51) Int. Cl.

| | | |
|---|---|---|
| *B01D 69/08* | (2006.01) | |
| *B01D 71/44* | (2006.01) | |
| *B01D 71/68* | (2006.01) | |
| *D01D 4/02* | (2006.01) | |
| *D01D 4/06* | (2006.01) | |
| *D01D 5/24* | (2006.01) | |
| *D01F 6/56* | (2006.01) | |
| *D01F 6/94* | (2006.01) | |

(52) U.S. Cl.
CPC ............. *D01D 4/02* (2013.01); *B01D 69/085* (2013.01); *B01D 69/088* (2013.01); *B01D 71/441* (2022.08); *B01D 71/68* (2013.01); *D01D 4/06* (2013.01); *D01D 5/24* (2013.01); *D01F 6/56* (2013.01); *D01F 6/94* (2013.01); *D10B 2321/12* (2013.01); *D10B 2331/30* (2013.01); *D10B 2505/04* (2013.01)

(58) Field of Classification Search
CPC ... D01D 4/02; D01D 4/06; D01D 5/24; B01D 69/085; B01D 69/088
See application file for complete search history.

(56) References Cited

U.S. PATENT DOCUMENTS 1,665,675 A * 4/1928 Paige .................... F04B 43/02
                                                     417/519
3,081,490 A    3/1963 Wilhelm et al.

FOREIGN PATENT DOCUMENTS

| CN | 102517652 | 6/2012 |
|---|---|---|
| EP | 3147024 | 3/2017 |
| JP | 2006272271 | 10/2006 |
| JP | 2017031003 | 2/2017 |

OTHER PUBLICATIONS

JP6507914 machine translation (Year: 2019).*
PCT Search Report and Written Opinion prepared for PCT Application No. PCT/EP2021/070330, completed Sep. 27, 2021.

* cited by examiner

*Primary Examiner* — Alison L Hindenlang
*Assistant Examiner* — Alexander A Wang
(74) *Attorney, Agent, or Firm* — Barnes & Thornburg LLP

(57) ABSTRACT

The present disclosure relates to a spinning beam for producing hollow fiber membranes in a phase inversion process, and to a process using the spinning beam.

4 Claims, 3 Drawing Sheets

SPINNING BEAM

CROSS-REFERENCE TO RELATED APPLICATIONS

This application is a national stage entry under 35 U.S.C. § 371 (b) of PCT International Application No. PCT/EP2021/070330, filed Jul. 21, 2021, which claims the benefit of European Patent Application Serial No. 20187259.5, filed on Jul. 22, 2020, the entire disclosures of both of which are incorporated herein by reference.

TECHNICAL FIELD

The present disclosure relates to a spinning beam comprising a multitude of spinnerets for producing hollow fiber membranes in a phase inversion process.

BACKGROUND OF THE INVENTION

Semipermeable hollow fiber membranes for application in medical devices, e.g., capillary dialyzers and capillary filters, are mostly manufactured using a phase inversion process. Spinnerets having a nozzle with two concentric orifices, an outer ring slit and a central bore, are commonly used. A polymer solution is extruded through the outer ring slit of the nozzle into a precipitation bath, and simultaneously a center fluid is extruded through the inner bore of the nozzle.

A spinning train comprises a plurality of spinnerets implemented in the spinning machines for producing a plurality of hollow fiber membranes which are bundled into a fiber strand. Hundreds of spinnerets are arranged in a spinning head, and each spinneret is individually supplied with the polymer solution and with the center fluid.

The spinning head generally comprises a spinning beam which is a rectangular steel bar with rectangular pockets for receiving individual spinnerets. The pockets are arranged side-by-side on the spinning beam. The number of spinnerets is limited by the length of the spinning beam. The spinnerets are inserted into the pockets and fixed in position using eccentric screws. Water is circulated through channels provided in the spinning beam to control the temperature of the fluids fed to the spinnerets, so that the fluids have the required temperature when they are extruded through the orifices of the spinnerets. As the eccentric screws displace the rectangular spinneret body towards one side of the rectangular pocket and only one wall of the spinneret contacts the wall of the pocket, heat transfer from the spinning beam to the spinneret and the fluids in the spinneret, respectively, is impaired.

A spinning train is an especially designed structure which includes sub-units for precipitating, washing, drying, crimping and collecting the fibers. This train of machines requires heavy investment. Increasing the spinning capacity requires replication of this machinery, and thus replication of the investment.

U.S. Pat. No. 3,081,490 A discloses a spinneret for the production of hollow filaments having six spinning orifices for manufacturing a thread with six separate filaments. The spinneret consists of two circular plates firmly held together by means of bushed screws. The plate is provided with a central spinning orifice with two alignment or registering bores for dowels and with a cylindrical duct or bore which is coaxial with the spinning orifice and is of greater diameter. The duct extends from the upper surface of the plate to the upper end of the spinning orifice. The underside of the plate is provided with a circular recess which forms a supply chamber for the spinning solution or melt and with bores which terminate in the recess and through which spinning solution or melt is supplied to the recess.

A supply passage opening into a bore is drilled in the plate for the supply of a gaseous or liquid medium to the interior of a hollow pin via an opening. The pin terminates in a capillary tube and is secured to the bore of the plate by means of a hollow screw and is concentrically located in the cylindrical bore which is of greater diameter than the pin. The pin is provided with a widened bearing surface which engages under the plate when the pin is fitted into the bore. The position of the capillary tube within the spinning orifice may be adjusted axially by means of packings under the head of the screw and on the bearing surface. A thin aluminum packing ring between the plates seals off the supply chamber when the screws are tightened. The dowel is firmly anchored in the plate and projects through a bore in the plate. The hollow pin is provided with lateral openings which start from a reduced portion of the pin casing. The pin may be fitted, at the level of the capillary attachment, with a centering member, the four radial projections of which are an accurate sliding fit within the cylindrical duct in the plate.

JP 6 507914 B2 provides a production method and a production device for glass fibers, which are capable of easily supplying gas for forming a hollow part in the glass fiber. The production method of the glass fiber having the hollow part involves pulling out molten glass in a bushing from a nozzle formed in a bottom part of the bushing. The hollow part is formed by inflowing bubbles generated by electrolysis of a component in the molten glass in the bushing. The production device includes the bushing having the nozzle in the bottom part, from which the molten glass is pulled out, and electrodes (an anode and a cathode) for applying a direct voltage to the molten glass in the bushing.

JP 2006 272271 A provides a process and a device for producing a porous hollow fiber membrane by dry and wet spinning. In the process, a temperature of the spinning nozzle and a undiluted solution discharge temperature are set so as to be a dew-point temperature or less of a free-running portion, and at the same time, the bottom face temperature in the vicinity of the undiluted solution discharge port is held so as to be the dew-point temperature or more and the dew-point temperature +50° C. or less with a heating means. The heating means is provided with a cylindrical or ring-shaped annular heat conductor arranged in contact with the nozzle bottom face in the vicinity of the undiluted solution discharge port of the spinning nozzle, a cylindrical electrothermal heater is arranged on the outer peripheral surface of the annular heat conductor, and a supporting plate is fixed surrounding a periphery of the electrothermal heater and the annular heat conductor, and at the same time, fixed to the nozzle bottom.

CN 102 517 652 A discloses an assembled type spinneret plate with a plurality of spinning nozzles, which comprises an upper spinneret plate, a middle spinneret plate and a lower spinneret plate, wherein the upper spinneret plate is provided with an inner condensing liquid inlet, a constant temperature liquid inlet, a membrane liquid inlet and a constant temperature liquid outlet. The inner condensing liquid inlet is connected with a middle spinneret plate liquid delivery tray on the middle spinneret plate by an upper spinneret plate liquid delivery sleeve. A middle spinneret plate liquid delivery sleeve is installed below the middle spinneret plate liquid delivery tray. The middle spinneret plate liquid delivery sleeve is connected with the spinning nozzles. The internal parts of the upper spinneret plate, the middle spinneret plate and the lower spinneret plate are provided with membrane liquid channels. The internal parts of the middle spinneret plate and the lower spinneret plate are provided with constant temperature liquid channels. A plurality of spinning nozzles are assembled on the spinneret plate, so that the spinneret plate is simple, compact and integrated in the structure. The membrane-making liquid channel, the inner condensing liquid channel and the constant temperature liquid channel are uniformly distributed and liquid flows smoothly, so that the sealing property and pressure resistance of the spinneret plate are realized.

EP 3 147 024 A1 discloses a method for producing a hollow-fiber polymer membrane having an isoporous inner skin, and a porous outer skin. The method comprises providing a polymer solution of at least one amphiphilic block copolymer in a solvent; extruding the polymer solution (dope) through a first annular die in a spinneret while simultaneously pressing a core gas stream through at least one orifice encircled by the first die and extruding a sheath liquid comprising at least one precipitant from a second annular die encircling the first die into air, and subsequently into an aqueous precipitation bath, thereby providing a gap between spinneret and precipitation solution through which the extruded polymer solution passes surrounded by the sheath liquid and surrounding the core gas stream, and finally precipitating the spinning solution in the precipitation bath to form the hollow-fiber polymer membrane.

It is an objective of the present disclosure to provide options for capacity expansion of a spinning train that do not require duplication of the whole equipment of the spinning train and allow for retrofitting of existing spinning trains. It is also an objective of the present disclosure to provide an improved spinning beam.

SUMMARY OF THE INVENTION

The present disclosure provides a spinning beam with honeycombed structures, each honeycombed structure featuring six hexagonal seats for individual spinnerets arranged around a central hexagonal feed unit configured for supplying the individual spinnerets with a polymer solution and a center fluid for the production of hollow fiber membranes.

The present disclosure also provides a hexagonal spinneret for installation in a hexagonal seat of the spinning beam of the present disclosure.

The present disclosure also provides a spinning unit comprising the spinning beam of the present disclosure and a multitude of spinnerets and supply units. A spinneret is present in each one of the hexagonal seats, and a supply unit is connected to each one of the central feed units. A process for the production of hollow fiber membranes using the spinning unit also is provided.

The spinning unit is designed to increase the capacity of a spinning train in comparison to a spinning train with a conventional arrangement of individual spinning nozzles. The number of pumps required for supplying the spinnerets with polymer solution and center fluid, respectively, is significantly reduced, and a retrofit of an existing spinning train requires little investment.

SHORT DESCRIPTION OF THE DRAWINGS

DETAILED DESCRIPTION

Figure 1:
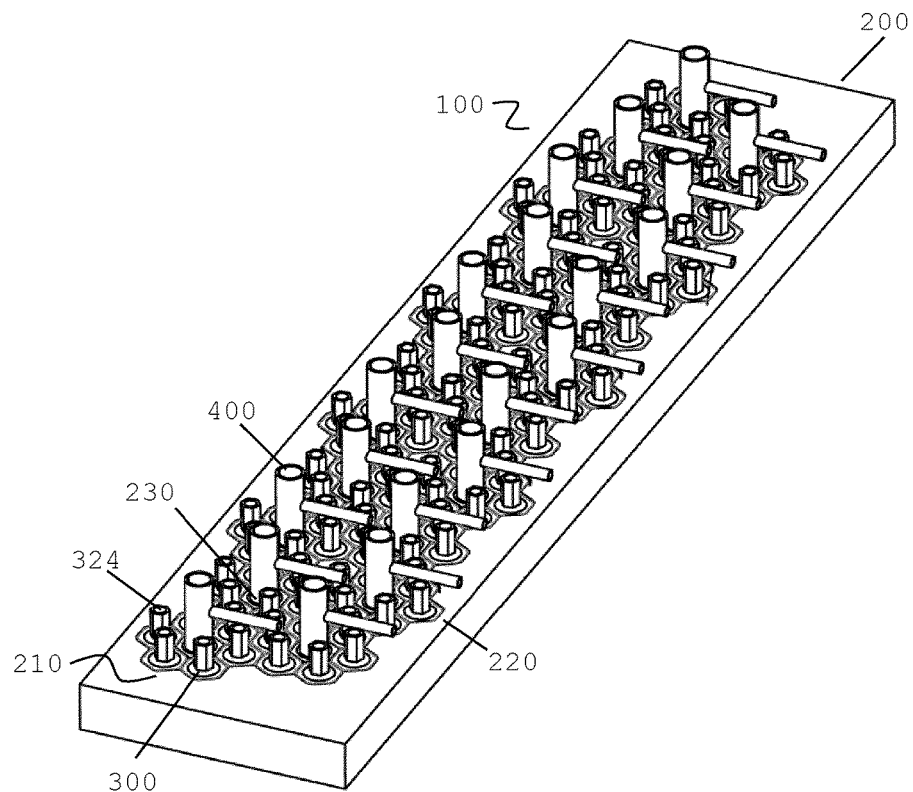
FIG. 1 shows a schematic perspective view of an embodiment of the spinning unit of the present disclosure.

A spinning beam with honeycombed structures is provided. Each honeycombed structure features six hexagonal seats for individual spinnerets arranged around a central hexagonal feed unit. The central hexagonal feed unit is configured for supplying the individual spinnerets with a polymer solution and a center fluid for the production of hollow fiber membranes.

The present disclosure provides a spinning beam comprising a plurality of honeycombed structures, each honeycombed structure comprising six hexagonal spinneret seats arranged around a central hexagonal feed unit. The feed unit comprises, on each of its six faces, both a feed port for a polymer solution and a feed port for a center fluid, and is configured to receive a supply pipe comprising ducts for the polymer solution and ducts for the center fluid which correspond to the feed ports for the polymer solution and the feed ports for the center fluid, respectively, of the feed unit. The feed unit also comprises an electrical heating element arranged in its base.

Due to the hexagonal form of the spinneret seats and the feed unit, ducts for a polymer solution and a center fluid provided in one wall of the body of the individual spinnerets are automatically aligned with ducts for a polymer solution and a center fluid provided in each of the six walls of the central feed unit. Also, the ducts for the polymer solution and ducts for the center fluid of the supply pipe are automatically aligned with the ducts for a polymer solution and the ducts for a center fluid provided in each of the six walls of the central feed unit. This greatly facilitates the assembly of the spinning unit, as no adjustment of the orientation of the spinnerets and the supply pipe, respectively, is required when mounting them on the spinning beam.

In one embodiment, each hexagonal spinneret seat tapers off towards the bottom of the seat. In one embodiment, the inner walls of each spinneret seat taper towards their bottom at an angle in the range of from 1° to 15°, for instance, from 5° to 15°, or from 10 to 15°. As the outer contour of the individual spinnerets matches the inner contour of the seats, the spinnerets are fastened in the seats by self-locking. When the body of the spinneret is fastened in the seat, each of the six side walls of the spinneret touches a wall of the seat, resulting in improved heat transfer from the spinning beam to the spinnerets.

A polymer solution and a center fluid for the production of hollow fiber membranes are fed from the central feed unit to the adjacent spinnerets through ducts provided in the walls of the central feed unit. An electric heating element is installed below the central feed unit. This allows for controlling the temperature of the polymer solution and the center fluid, respectively, in the feed unit, before they are conveyed to the spinnerets.

In comparison to the conventional design of spinning beams, the spinning beam of the present disclosure allows for increasing the number of spinnerets placed on a spinning beam of given length and width. The number of spinnerets can easily be tripled or increased even more. As the channels for circulating heating fluid through the spinning beam are eliminated and replaced by the electric heating elements present below the hexagonal feed units, the spinning beam can have a more compact design.

In one embodiment of the spinning beam, each honeycombed structure of the spinning beam touches at least two other honeycombed structures of the spinning beam. In a further embodiment, at least three of the spinneret seats of each honeycombed structure of the spinning beam abut on a spinneret seat of another honeycombed structure of the spinning beam.

The present disclosure also provides a hexagonal spinneret for installation in a hexagonal seat of the spinning beam of the present disclosure. The hexagonal spinneret features a nozzle having two concentric orifices, an outer ring slit and a central orifice (a "twin slit nozzle").

The present disclosure provides a spinneret for producing hollow fiber membranes which comprises a spinneret body and a spinneret core.

The spinneret body has a hexagonal outer contour and an axially symmetric central cavity, a duct for a polymer solution and a duct for a center fluid which connect the central cavity to one of the outer faces of the spinneret body, and an orifice at the bottom of the central cavity.

The spinneret comprises a spinneret body having a hexagonal outer contour. In one embodiment, the spinneret body tapers from its top towards its bottom. In one embodiment, the outer faces of the spinneret body taper towards their bottom at an angle in the range of from 1° to 15°. The tapering angle, i.e., the aperture of a corresponding hexagonal pyramid, is in the range of from 1° to 15°, e.g., from 5° to 15°, or from 10° to 15°. The tapered outer contour of the spinneret makes it self-locking in an equally tapered spinneret seat of the spinning beam. The smaller the tapering angle, the larger the force required for disassembly of the spinneret from the spinning beam. The angle at which self-locking occurs depends on various parameters, like surface quality, material pairing and shape of the spinneret.

The spinneret body features a duct for polymer solution and a duct for center fluid in one wall of the spinneret body. When the spinneret is inserted into a spinneret seat of a honeycombed structure, the wall with the ducts touches an outer wall of the central feed unit of the honeycombed structure. The duct for polymer solution is connected to the circumferential cavity for polymer solution. The mouth of the circumferential cavity for polymer solution forms the outer ring slit of a twin slit nozzle of the spinneret.

In one embodiment, the spinneret body features a sealing gasket surrounding the orifices of the duct for a polymer solution and the duct for a center fluid in the outer face of the spinneret body.

The spinneret also comprises an axially symmetrical spinneret core within the spinneret body. The spinneret core is arranged in the central cavity of the spinneret body, and the spinneret body and the spinneret core together define a circumferential cavity for a center fluid and a circumferential cavity for a polymer solution within the spinneret.

One or more ducts connect the circumferential cavity for center fluid to a central cavity of the spinneret core, the cavity extending along the central longitudinal axis of the spinneret core. A capillary connects the central cavity to the orifice of the spinneret body. The mouth of the capillary forms the inner orifice of a twin slit nozzle of the spinneret.

The spinneret core has an axial bore with a fine thread. A regulating screw is positioned in the axial bore of the spinneret core. The regulating screw seals the top of the central cavity of the spinneret core and is configured to regulate a flow of a center fluid through the spinneret core. When the regulating screw is lowered, it partially occludes the duct for the center fluid, restricting the flow through the duct.

The present disclosure also provides a spinning unit comprising the spinning beam of the present disclosure and a multitude of spinnerets and supply units. A spinneret is present in each of the hexagonal seats, and a supply unit is connected to each of the central feed units.

The spinning unit of the present disclosure comprises the spinning beam of the present disclosure, a plurality of the spinnerets of the present disclosure, each spinneret being fastened in a spinneret seat of the spinning beam, and a plurality of supply pipes, each supply pipe being fastened in a feed unit of the spinning beam.

In one embodiment, the supply pipe features a feed pipe for a polymer solution and a feed pipe for a center fluid. The feed pipes are coaxial, the feed pipe for the polymer solution being located inside the feed pipe for the center fluid.

In one embodiment, the feed pipe for the center fluid is directly connected to a center fluid reservoir, and the feed pipe for the polymer solution is connected to a polymer solution reservoir via a connecting pipe. The connecting pipe penetrates the wall of the outer pipe.

Ducts for the polymer solution and ducts for the center fluid are provided at the bottom of the supply pipe for supplying the spinnerets with polymer solution and center fluid, respectively. The orifices of the ducts match the corresponding orifices of the ducts in the walls of the central feed unit, when the supply pipe is inserted into the central hexagonal feed unit of a honeycombed structure of the spinning beam.

The spinning unit of the present disclosure significantly reduces space requirements for spinning machines. Alternatively, spinning capacity of a spinning train can be increased without requiring further space, by replacing conventional spinning units with the spinning unit of the present disclosure.

It is a further advantage of the spinning unit of the present invention that only one pump for polymer solution and one pump for center fluid are required per honeycombed structure, i.e., for six spinnerets. Compared to a conventional spinning machine producing the same number of fibers, only a fraction of the number of pumps is required.

Another advantage of the spinning unit of the present disclosure is related to its modular design, which allows for the replacement of individual spinnerets and supply units, respectively. Maintenance of the spinning unit thus is greatly facilitated.

Further, center fluid flow through each individual spinneret can be calibrated independently from the flow of center fluid through the other spinnerets by means of the regulating screw. This calibration can even be performed for each spinneret before it is installed in the spinning beam, making sure that center fluid flow through each of the individual spinnerets in the spinning unit is the same. As the flow rate of the center fluid through the spinneret affects the inner diameter of the hollow fiber membrane produced, this is crucial for ensuring consistent fiber dimensions.

The present disclosure also provides a process for the production of hollow fiber membranes, comprising simultaneously feeding a polymer solution and a center fluid to a feed unit of the spinning unit of the present disclosure; extruding the polymer solution through the orifices and simultaneously extruding the center fluid through the capillaries of the spinnerets of the spinning unit of the present disclosure.

Suitable polymer solutions and suitable center fluids for the production of semipermeable hollow fiber membranes are well known in the art. For instance, a solution comprising 1) at least one polysulfone, polyethersulfone, or polyarylethersulfone, and 2) at least one polyvinylpyrrolidone dissolved in 3) a mixture of N-methyl-2-pyrrolidone (NMP) and water may be used as the polymer solution, and a mixture of water and NMP may be used as the center fluid.

The spinning unit of the present disclosure will now be further explained by reference to the accompanying figures.

FIG. 1 shows a perspective view of an exemplary embodiment of the spinning unit 100 of the present disclosure. A spinning beam 200 features a plurality of honeycombed structures 210. Each honeycombed structure 210 comprises six hexagonal spinneret seats 220 arranged around a central hexagonal feed unit 230. A hexagonal spinneret 300 is present in each hexagonal spinneret seat 220; and a supply pipe 400 is connected to each hexagonal feed unit 230. Each supply pipe 400 is connected to a polymer solution reservoir and a center fluid reservoir (not shown). A regulating screw 324 is present on each spinneret 300, allowing for regulating the flow of center fluid through each spinneret 300 individually.

Figure 2:
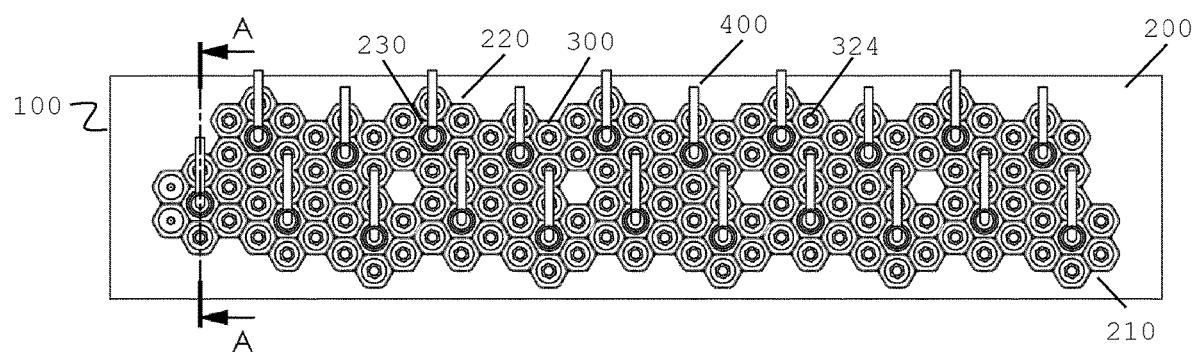
FIG. 2 is a top view of the spinning unit of FIG. 1.

FIG. 2 is a top view of the spinning unit 100 shown in FIG. 1.

Figure 3:
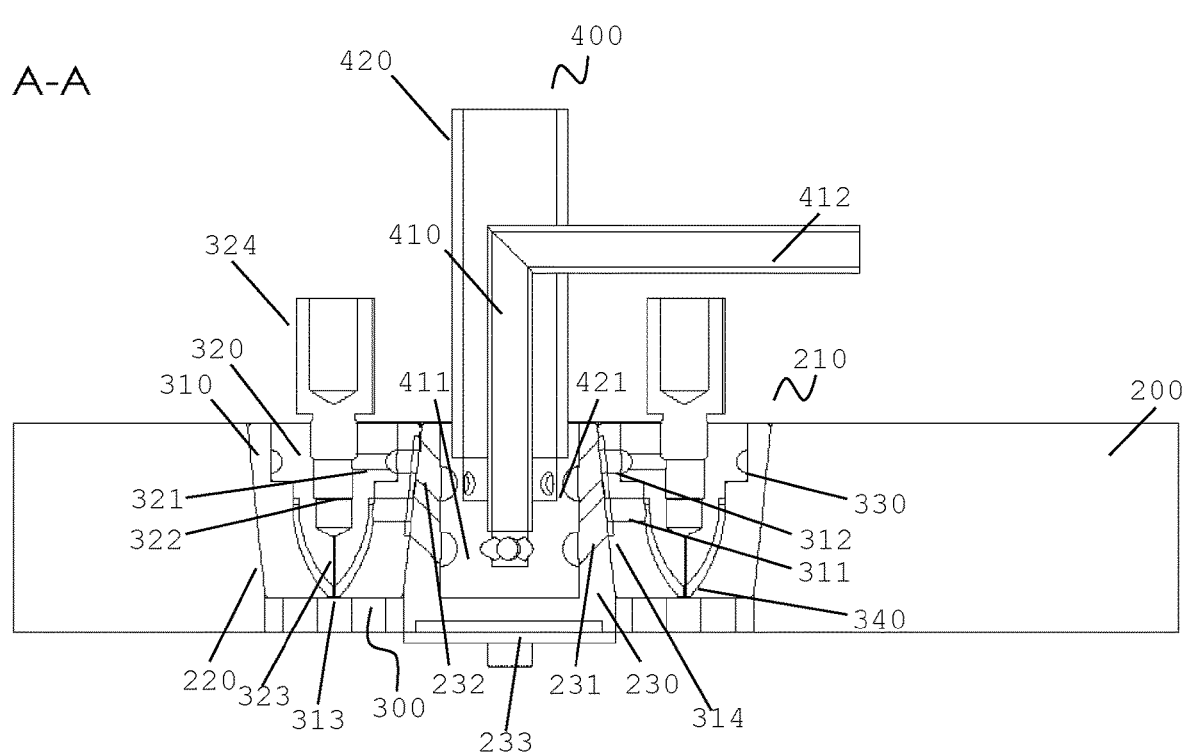
FIG. 3 is a sectional view of one of the honeycombed structures of the spinning unit of FIG. 1.

FIG. 3 is a sectional view (section A-A) of the spinning unit 100 shown in FIG. 2; showing a longitudinal section through the center of the honeycombed structure 210 passing through the center of the central hexagonal feed unit 230 and two of the six hexagonal spinneret seats 220.

A supply pipe 400 is inserted into the central hexagonal feed unit 230. The supply pipe 400 features a feed pipe 410 for polymer solution and a feed pipe 420 for center fluid. The feed pipes 410, 420 are coaxial, the feed pipe 410 for polymer solution being located inside the feed pipe 420 for center fluid. The feed pipe 420 for center fluid is directly connected to a center fluid reservoir, the feed pipe 410 for polymer solution is connected to a polymer solution reservoir via connecting pipe 412. The connecting pipe 412 is joined to the feed pipe 410 for polymer solution at the upper end of the feed pipe 410. At the bottom of the supply pipe 400, ducts 411 for polymer solution and ducts 421 for center fluid are provided for supplying the spinnerets 300.

An electrical heating element 233 is arranged below the central hexagonal feed unit 230 and allows for controlling the temperature of the polymer solution and the center fluid, respectively. The central hexagonal feed unit 230 features a feed port 231 for polymer solution and a feed port 232 for center fluid in each of its walls to supply the spinnerets 300 with polymer solution and center fluid, respectively.

A corresponding duct 311 for polymer solution and a corresponding duct 312 for center fluid are provided in the body 310 of each spinneret 300 where it touches the wall of the central feed unit 230. A sealing gasket 314 is provided in the outer surface of the spinneret body 310 between the orifices of the ducts 311, 312 and the corresponding orifices of the ports 231, 232 of the feed unit 230. Each spinneret 300 features a spinneret core 320. The spinneret body 310 and the spinneret core 320 together define a circumferential cavity 330 for center fluid and a circumferential cavity 340 for polymer solution. One or more ducts 321 for center fluid connect the circumferential cavity 330 with a central cavity 322 of the spinneret core 320. A capillary 323 connects the central cavity 322 to the nozzle 313 of the spinneret 300. The flow of center fluid through the spinneret core 320 can be regulated by the regulating screw 324. When the regulating screw 324 is turned downwards, it partially seals the duct 321 for center fluid, restricting the flow through the duct 321. The duct 311 for polymer solution is connected to the circumferential cavity 340 for polymer solution. The mouth of cavity 340 forms the outer ring slit of nozzle 313.

Figure 4:
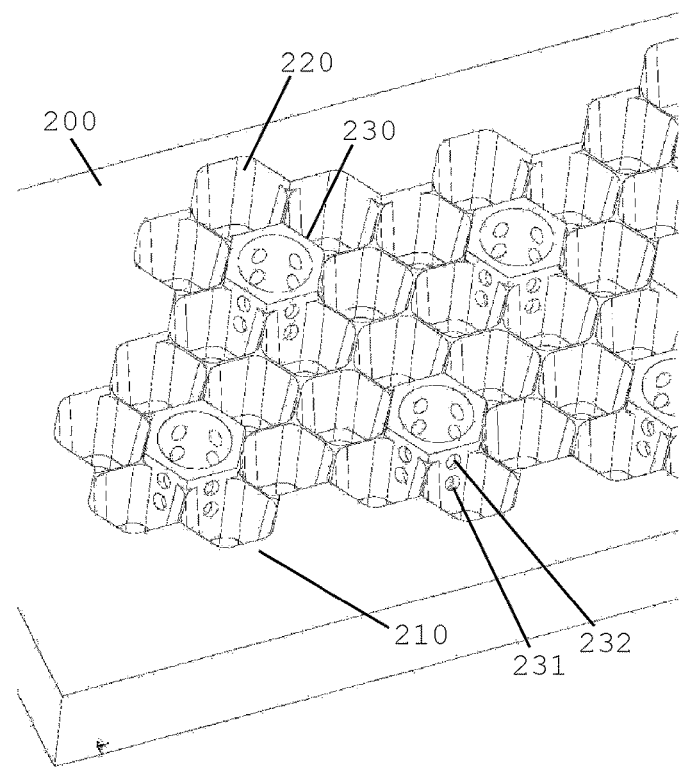
FIG. 4 is a partial perspective view of an embodiment of the spinning beam of the present disclosure.

FIG. 4 is a partial perspective view of an embodiment of the spinning beam 200 of the present disclosure. The spinning beam 200 features a plurality of honeycombed structures 210 arranged adjacent to each other. As shown in the figure, the honeycombed structures 210 can form a dense packing, as their outer contours match each other. Up to six honeycombed structures 210 can be arranged around a central honeycombed structure 210, provided that the dimensions of the spinning beam 200 are large enough.

Each honeycombed structure 210 features six tapered hexagonal spinneret seats 220 arranged around a central hexagonal feed unit 230 which tapers towards its top. A feed port 231 for polymer solution and a feed port 232 for center fluid are present in each of the six walls of the central feed unit 230. The central feed unit 310 features a central bore for insertion of a supply pipe. In an exemplary embodiment, the diameter of the bore ranges from 10 mm to 15 mm, e.g., 12 mm.

Figure 5:
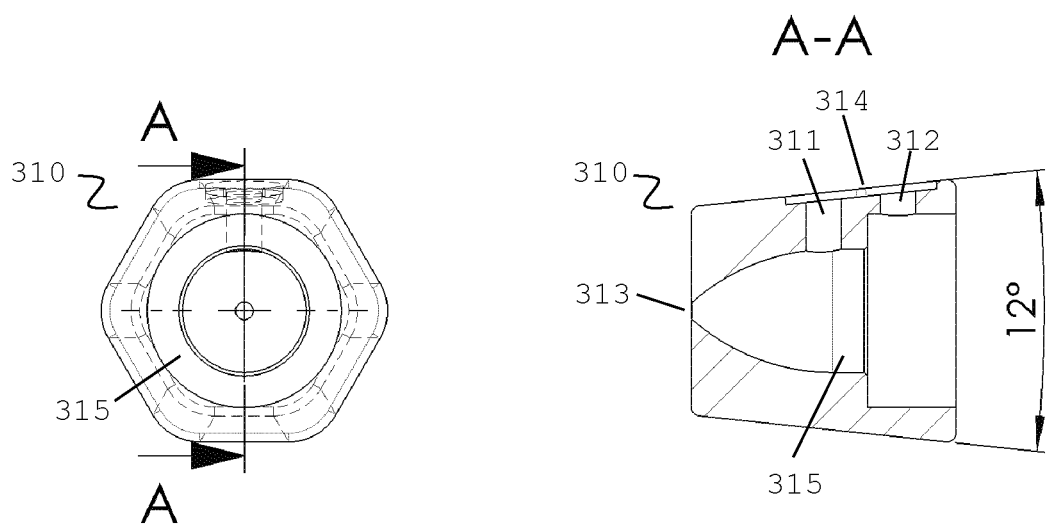
FIG. 5 shows a top view and a sectional view of an embodiment of a spinneret body of the present disclosure.

FIG. 5 shows a top view and a sectional view (section A-A) of an embodiment of a spinneret body 310 of the present disclosure. The spinneret body 310 has a hexagonal outer contour and an axially symmetrical central cavity 315 defined by a boring. The spinneret body 310 comprises a duct 311 for polymer solution and a duct 312 for center fluid connecting the central cavity 315 to one of the outer faces of the spinneret body 310. A sealing gasket 314 is provided in the outer surface of the spinneret body 310 to prevent leaking of fluids from the ducts 311, 312 when the spinneret body 310 is connected to the feed unit. A nozzle 313 is present at the bottom of the spinneret body 310. In the example shown in FIG. 5, the outer wall faces of the spinneret body 310 taper at an angle of 12°. The tapered form of the spinneret body 310 allows for self-locking of the spinneret in an equally tapered spinneret seat.

LIST OF REFERENCE SIGNS 100 spinning unit
200 spinning beam
210 honeycombed structure
220 hexagonal spinneret seat
230 hexagonal feed unit
231 feed port for polymer solution
232 feed port for center fluid
233 electrical heating element
300 hexagonal spinneret
310 spinneret body
311 duct for polymer solution
312 duct for center fluid
313 nozzle
314 sealing gasket
315 central cavity
320 spinneret core
321 duct for center fluid
322 cavity for center fluid
323 capillary
324 regulating screw
330 circumferential cavity for center fluid
340 circumferential cavity for polymer solution
400 supply pipe
410 feed pipe for polymer solution
411 duct for polymer solution
412 connecting pipe
420 feed pipe for center fluid
421 duct for center fluid

The invention claimed is:

1. A spinning unit comprising:

a spinning beam comprising a plurality of honey combed structures, each honeycombed structure comprising six hexagonal spinneret seats arranged around a central hexagonal feed unit, the feed unit comprising, on each of its six faces, both a feed port for a polymer solution and a feed port for a center fluid, the feed unit being configured to receive a supply pipe comprising ducts for the polymer solution and ducts for the center fluid which correspond to the feed ports for the polymer solution and the feed ports for the center fluid, respectively, of the feed unit; and the feed unit comprising an electrical heating element arranged in its base, a plurality of spinnerets for producing hollow fiber membranes, each spinneret comprising a spinneret body having a hexagonal outer contour and an axially symmetric central cavity and comprising a duct for a polymer solution, a duct for a center fluid, the ducts connecting the central cavity to one of the outer faces of the spinneret body, and an orifice at the bottom of the central cavity; and a spinneret core arranged in the central cavity of the spinneret body, the spinneret body and the spinneret core together defining a circumferential cavity for a center fluid and a circumferential cavity for a polymer solution, the spinneret core comprising one or more ducts for a center fluid connecting the circumferential cavity to a central cavity of the spinneret core; and a capillary connecting the central cavity of the spinneret core to the orifice of the spinneret body; and a regulating screw sealing the top of the central cavity of the spinneret core and being configured to regulate a flow of a center fluid through the spinneret core by partially sealing the one or more ducts for a center fluid when the regulating screw is turned downwards, each spinneret being fastened in a spinneret seat of the spinning beam by self-locking, and a plurality of supply pipes, each supply pipe being fastened in a feed unit of the spinning beam, wherein each spinneret comprises an outer contour and each spinneret seat comprises an inner contour, and wherein the outer contour of each spinneret matches the inner contour of each spinneret seat.

2. The spinning unit of claim 1, wherein the supply pipe features a feed pipe for a polymer solution and a feed pipe for a center fluid, the feed pipes being coaxial, the feed pipe for the polymer solution being located inside the feed pipe for the center fluid, and ducts for the polymer solution and ducts for the center fluid being provided at the bottom of the supply pipe for supplying the spinnerets.

3. The spinning unit of claim 2, wherein the feed pipe for the center fluid is directly connected to a center fluid reservoir, and the feed pipe for the polymer solution is connected to a polymer solution reservoir via a connecting pipe.

4. The spinning unit of claim 1, wherein the spinneret seat comprises an inner wall, and wherein the inner wall tapers towards the bottom of the inner wall.

* * * * *